US012608946B1

(12) United States Patent
Tu et al.

(10) Patent No.:  US 12,608,946 B1
(45) Date of Patent:      Apr. 21, 2026

(54) SURVEILLANCE SYSTEM WITH FUNCTION OF AUTOMATICALLY GENERATING TEXT SUMMARIES AND GENERATION METHOD THEREOF

(71) Applicant: PRIMAX ELECTRONICS LTD., Taipei City (TW)

(72) Inventors: Hung-Te Tu, Taipei City (TW); Sheng-Ling Huang, Taipei City (TW); Chang-Yung Feng, Taipei City (TW); Yen-Ting Chen, Taipei City (TW); Shyh-Yaw Jou, Taipei City (TW); Chung-Han Chen, Taipei City (TW); Jui-Jen Cheng, Taipei City (TW)

(73) Assignee: PRIMAX ELECTRONICS LTD., Taipei City (TW)

( * ) Notice: Subject to any disclaimer, the term of this patent is extended or adjusted under 35 U.S.C. 154(b) by 0 days.

(21) Appl. No.: 19/069,266

(22) Filed: Mar. 4, 2025

(30) Foreign Application Priority Data

Jan. 9, 2025    (TW) ................................. 114100920

(51) Int. Cl.
| | |
|---|---|
| *H04N 7/18* | (2006.01) |
| *G06T 7/246* | (2017.01) |
| *G06V 20/40* | (2022.01) |
| *G06V 20/52* | (2022.01) |

(52) U.S. Cl.
CPC .............. *G06V 20/52* (2022.01); *G06T 7/246* (2017.01); *G06V 20/47* (2022.01)

(58) Field of Classification Search
CPC .......... H04N 7/18; H04N 21/44; G06V 20/52; G06V 20/47; G06T 7/246
USPC .......................................................... 348/143
See application file for complete search history.

(56) References Cited

U.S. PATENT DOCUMENTS

| | | | | |
|---|---|---|---|---|
| 6,961,954 | B1 * | 11/2005 | Maybury ............... | G11B 27/28 |
| | | | | 725/53 |
| 9,542,604 | B2 * | 1/2017 | Cho ...................... | G11B 27/031 |
| 9,946,711 | B2 * | 4/2018 | Reiter ..................... | G08B 5/22 |
| 10,565,455 | B2 * | 2/2020 | Fridental ............... | G06V 20/47 |
| 11,238,289 | B1 * | 2/2022 | Tao ......................... | G06F 16/784 |
| 2018/0160200 | A1 * | 6/2018 | Goel ....................... | G06F 16/43 |

* cited by examiner

*Primary Examiner* — Trang U Tran
(74) *Attorney, Agent, or Firm* — WPAT, PC

(57)      ABSTRACT

A surveillance system with a function of automatically generating text summaries and a text summary generation method are provided. The surveillance system includes a portable electronic device, an image capturing device, a computing device and a signal transmission device. The image capturing device captures an image of a surveillance area. When an intelligent application image recognition program in the computing device is read and executed, the captured image of the surveillance area is processed into the corresponding text summary. In addition, the text summary is transmitted to the portable electronic device through the signal transmission device.

14 Claims, 10 Drawing Sheets

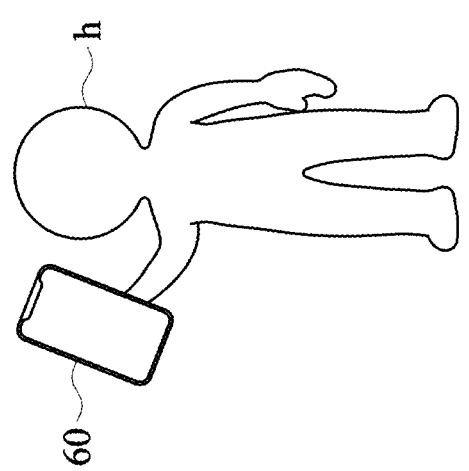
h
60
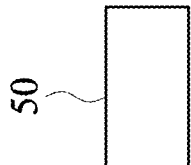
50
1
CP
30
40
10
20
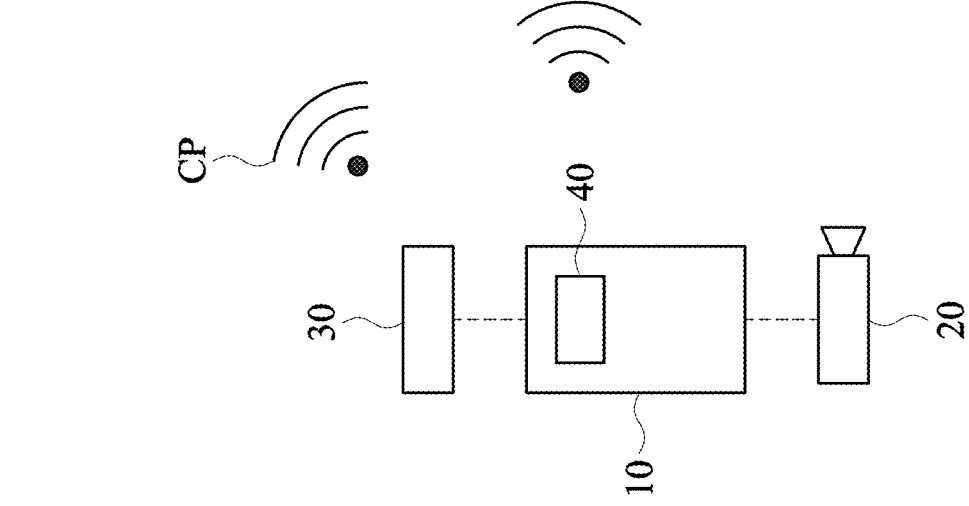
*FIG. 1A*

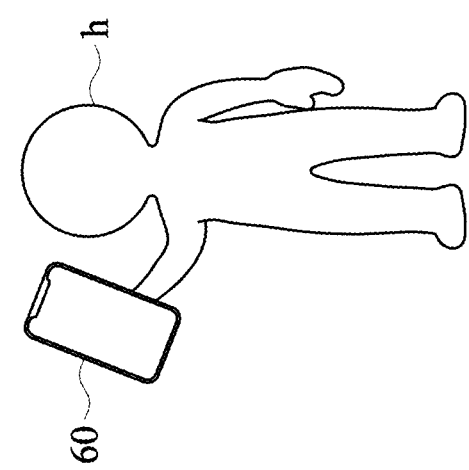
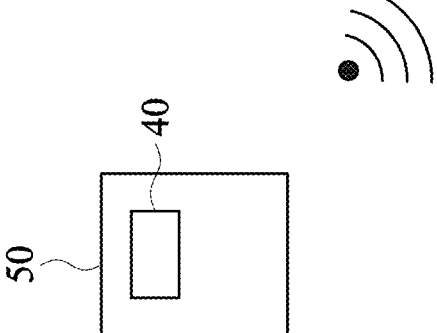
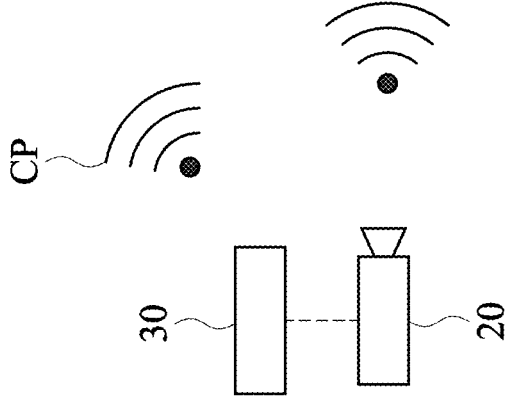
*FIG. 1B*

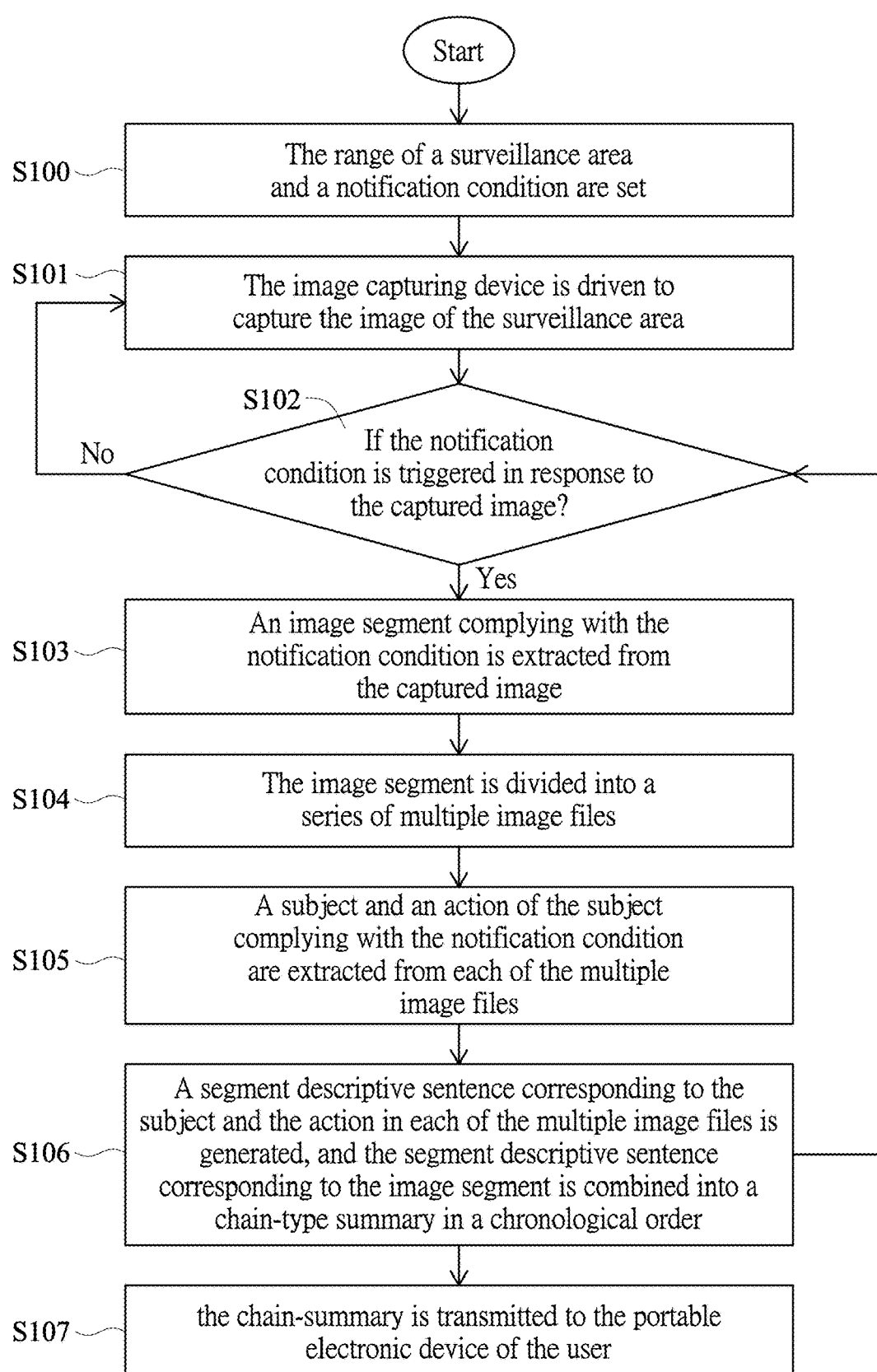

S100 — The range of a surveillance area and a notification condition are set

S101 — The image capturing device is driven to capture the image of the surveillance area S102 — If the notification condition is triggered in response to the captured image?

No

Yes

S103 — An image segment complying with the notification condition is extracted from the captured image S104 — The image segment is divided into a series of multiple image files S105 — A subject and an action of the subject complying with the notification condition are extracted from each of the multiple image files S106 — A segment descriptive sentence corresponding to the subject and the action in each of the multiple image files is generated, and the segment descriptive sentence corresponding to the image segment is combined into a chain-type summary in a chronological order S107 — the chain-summary is transmitted to the portable electronic device of the user

The range of the surveillance
area is set                          S1001

An object recognition feature in
the notification condition is set    S1002

An object motion recognition feature
in the notification condition is et  S1003

S104

S105

The timestamps are added to the multiple image files respectively and sequentially ～ S1051

The subject complying with the object recognition feature is extracted according to the object recognition feature ～ S1052

The action complying with the object action recognition feature is extracted according to the object action recognition feature ～ S1053

S106

SURVEILLANCE SYSTEM WITH FUNCTION OF AUTOMATICALLY GENERATING TEXT SUMMARIES AND GENERATION METHOD THEREOF

FIELD OF THE INVENTION

The present invention relates to an environmental surveillance system, and more particularly to an intelligent surveillance system capable of generating specific information.

BACKGROUND OF THE INVENTION

With the advent of a low birth rate and an aging society, family members who work outside often rely on home security surveillance systems to keep track of the statuses of children or elderly members at home. Home security surveillance systems not only effectively deter potential intruders but also provide real-time surveillance and evidence collection in the event of safety incidents.

Conventionally, family members who work outside usually rely on the images captured by the video cameras in home security surveillance systems to observe the statuses of their home or the surrounding environment. However, the action of frequently viewing a large amount of surveillance images not only consumes time and energy to reduce work efficiency, but also significantly increases network traffic due to the high volume of video transmission.

In accordance with the existing technologies, electronic fences can be set within the surveillance area. Furthermore, only when foreign objects intrude into the electronic fence, anomaly notifications are generated. Meanwhile, users can review the notified video contents to judge the anomaly conditions and manually determine whether the anomaly poses a potential safety concern. Although electronic fences in the existing technologies effectively reduce the time and frequency users spend watching surveillance images, statistics show that up to 50% of anomaly notifications from electronic fences are still classified as harmless.

In order to overcome the drawbacks of the conventional technologies, it is important to provide a security surveillance system for allowing users to quickly understand the status of the surveillance area.

SUMMARY OF THE INVENTION

The present invention provides a security surveillance system for allowing users to quickly understand the status of the surveillance area.

In accordance with an aspect of the present invention, a surveillance system with a function of automatically generating text summaries is provided. The surveillance system includes a portable electronic device, an image capturing device, a computing device and a signal transmission device. The image capturing device captures an image of a surveillance area. An intelligent application image recognition program is stored in the computing device. When the intelligent application image recognition program in the computing device is read and executed, an automatic text summary generation method is performed. The automatic text summary generation method includes steps of: (a) setting a range of the surveillance area and a notification condition, (b) driving the image capturing device to capture the image of the surveillance area, (c) judging whether the notification condition is triggered in response to the captured image, (d) if an image segment in the captured image complies with the notification condition, extracting the image segment from the captured image, (e) divided the image segment into a series of multiple image files, (f) extracting a subject and an action of the subject complying with the notification condition from each of the multiple image files, and (g) generating a segment descriptive sentence corresponding to the subject and the action in each of the multiple image files, and combining the segment descriptive sentence corresponding to the image segment into a chain-type summary in a chronological order. The signal transmission device is in communication with each of the portable electronic device, the image capturing device and the computing device. The chain-type summary is transmitted from the computing device to the portable electronic device through the signal transmission device via the communication.

Preferably, in the step (a), the notification condition contains at least one object recognition feature and at least one object motion recognition feature.

In an embodiment, the step (f) performed by the computing device includes steps of: (f1) extracting the subject complying with the at least one object recognition feature according to the at least one object recognition feature, and (f2) extracting the action complying with the at least one object action recognition feature according to the at least one object action recognition feature.

In an embodiment, the step (f) performed by the computing device further includes a step of adding timestamps to the multiple image files respectively and sequentially.

In an embodiment, the step (g) performed by the computing device includes steps of: (g1) generating a subject descriptive sentence corresponding to the subject and a motion descriptive sentence corresponding to the motion, and (g2) combining the subject descriptive sentence and the motion descriptive sentence in the chronological order so as to form the segment descriptive sentence.

In an embodiment, the step (e) performed by the computing device includes steps of: (e1) dividing the image segment into the multiple image files, and (e2) adding timestamps to the multiple image files respectively and sequentially.

In an embodiment, the computing device is a home computer or a cloud server.

In an embodiment, the intelligent application image recognition program has an image recognition model database, and the image recognition model database contains a plurality of object recognition feature data and a plurality of object action recognition feature data. The plurality of object recognition feature data and the plurality of object action recognition feature data are added to the image recognition model database according to input training data from the image segment.

In accordance with another aspect of the present invention, an automatic text summary generation method is provided for analyzing an image that is captured in a surveillance area by an image capturing device. The automatic text summary generation method includes steps of: (a) setting a range of the surveillance area and a notification condition, (b) driving the image capturing device to capture the image of the surveillance area, (c) judging whether the notification condition is triggered in response to the captured image, (d) if an image segment in the captured image complies with the notification condition, extracting the image segment from the captured image, (e) divided the image segment into a series of multiple image files, (f) extracting a subject and an action of the subject complying with the notification condition from each of the multiple image files, and (g) generating a segment descriptive sentence corresponding to the subject and the action in each of the multiple image files, and combining the segment descriptive sentence corresponding to the image segment into a chain-type summary in a chronological order, and (h) transmitting the chain-type summary to a portable electronic device.

Preferably, in the step (a), the notification condition contains at least one object recognition feature and at least one object motion recognition feature.

In an embodiment, the step (f) includes steps of: (f1) extracting the subject complying with the at least one object recognition feature according to the at least one object recognition feature, and (f2) extracting the action complying with the at least one object action recognition feature according to the at least one object action recognition feature.

In an embodiment, the step (f) further includes a step of adding timestamps to the multiple image files respectively and sequentially.

In an embodiment, the step (g) includes steps of: (g1) generating a subject descriptive sentence corresponding to the subject and a motion descriptive sentence corresponding to the motion, and (g2) combining the subject descriptive sentence and the motion descriptive sentence in the chronological order so as to form the segment descriptive sentence.

In an embodiment, the step (e) includes steps of: (e1) dividing the image segment into the multiple image files, and (e2) adding timestamps to the multiple image files respectively and sequentially.

From the above descriptions, the present invention provides a surveillance system with the function of automatically generating text summaries. When compared with the conventional technologies, the technologies of the present invention are more advantageous. When a specified notification condition is triggered, the image segment complying with the notification conditions is extracted from the captured image, and the segment descriptive sentence and the chain-type summary corresponding to the image segment are generated. The user can obtain the chain-type summary through the portable electronic device. Consequently, the user can quickly understand the status of the surveillance area according to the chain-type summary without the need to spend a large amount of time and effort to watch surveillance images.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 1A schematically illustrates the architecture of a surveillance system with the function of automatically generating text summaries according to a first embodiment of the present invention;

FIG. 1B schematically illustrates the architecture of a surveillance system with the function of automatically generating text summaries according to a second embodiment of the present invention;

FIG. 2 is a flowchart illustrating an automatic text summary generation method through the captured images according to an embodiment of the present invention;

DETAILED DESCRIPTION OF THE PREFERRED EMBODIMENT

Figure 3:
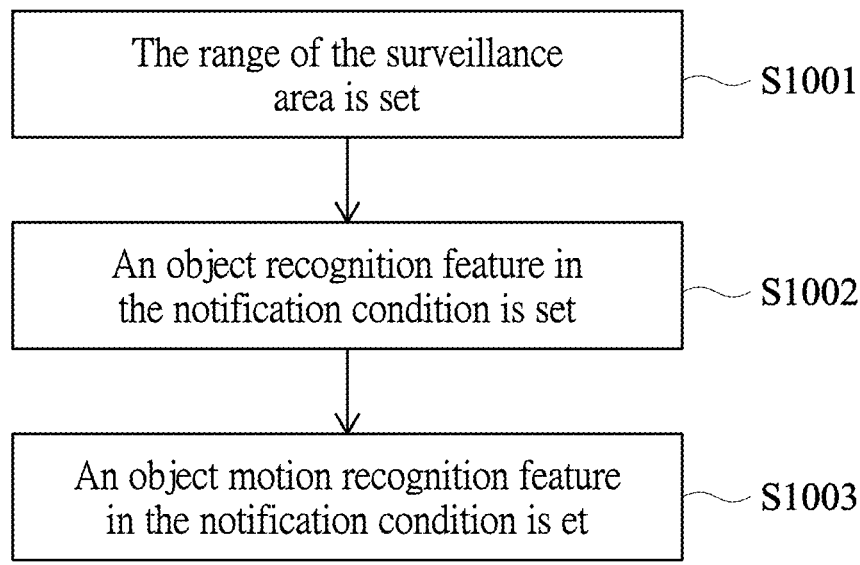
FIG. 3 is a flowchart illustrating the steps of the step S100 in the method of FIG. 2.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Please refer to FIG. 1A. FIG. 1A schematically illustrates the architecture of a surveillance system with the function of automatically generating text summaries according to a first embodiment of the present invention. As shown in FIG. 1A, the surveillance system 1 includes a computing device 10, an image capturing device 20, a signal transmission device 30, an intelligent application image recognition program 40, a cloud server 50 and a portable electronic device 60. The computing device 10 is in communication and electric connection with the image capturing device 20 and the signal transmission device 30. The intelligent application image recognition program 40 is stored in a storage module or a non-volatile memory (not shown) of the computing device 10. The computing device 10 can read and execute the intelligent application image recognition program 40. When the intelligent application image recognition program 40 is executed, a series of image processing and text generating steps are performed on the images that are captured or recorded by the image capturing device 20.

For example, the computing device 10 is a home computer, the image capturing device 20 is a video camera or a surveillance camera, the signal transmission device 30 is a network bridge, a network switch, a router, a Bluetooth device or a network switch, and the portable electronic device 60 is a smart phone or a tablet computer.

The signal transmission device 30 can be in a communication with each of the portable electronic device 60, the image capturing device 20 and the computing device 10 according to a wired signal transmission technology or a communication protocol CP. For example, the communication protocol CP is a mobile network protocol (e.g., a 4G or 5G network protocol), a wireless local area network transmission protocol (e.g., a Wi-Fi transmission protocol), a Bluetooth communication protocol, or an Internet Protocol (IP-based protocol).

In some embodiments, when the intelligent application image recognition program 40 is executed, the associated data are processed into images or text information by the computing device 10. In addition, the images or text information will be uploaded to the cloud server 50 through the signal transmission device 30 according to the communication protocol CP. Afterwards, the generated images or text information can be transmitted to the portable electronic device 60 through a short message service (SMS), an electronic mail (E-mail) or an APP interface. In this way, the user h can read the generated images or text information through the portable electronic device 60.

In some other embodiments, the images or text information is not transmitted to the cloud server 50. Instead, the images or text information generated by the computing device 10 can be directly transmitted to the portable electronic device 60 according to the communication protocol CP (e.g., the Bluetooth communication protocol).

Please refer to FIG. 1B. FIG. 1B schematically illustrates the architecture of a surveillance system with the function of automatically generating text summaries according to a second embodiment of the present invention.

As shown in FIG. 1B, the surveillance system 1' includes an image capturing device 20, a signal transmission device 30, an intelligent application image recognition program 40, a cloud server 50 and a portable electronic device 60. The intelligent application image recognition program 40 is stored in the cloud server 50. The images captured or recorded by the image capturing device 20 can be uploaded to the cloud server 50 through the signal transmission device 30 according to the communication protocol CP. The cloud server 50 can read and execute the intelligent application image recognition program 40 to perform a series of image processing and text generating steps on the received images. Afterwards, the generated images or text information can be transmitted to the portable electronic device 60 through a short message service (SMS), an electronic mail (E-mail) or an APP interface.

Figure 4:
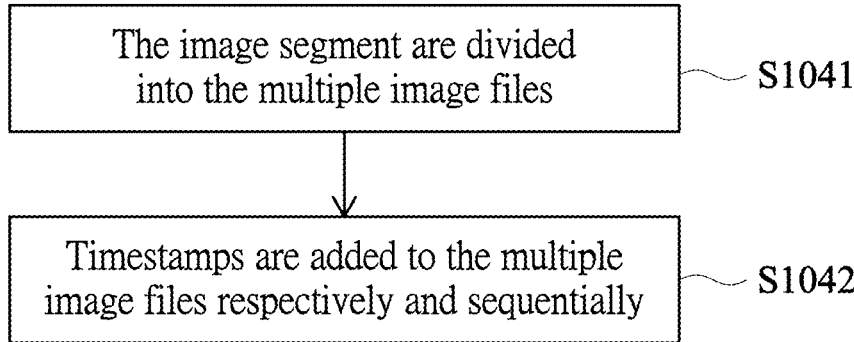
FIG. 4 is a flowchart illustrating the steps of the step S104 in the method of FIG. 2.
Figure 5:
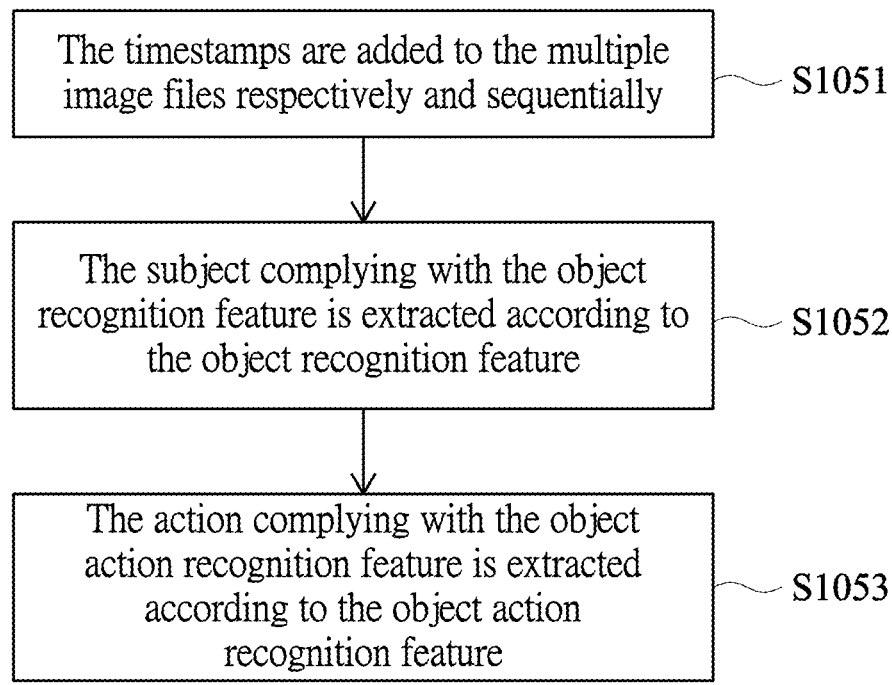
FIG. 5 is a flowchart illustrating the steps of the step S105 in the method of FIG. 2.
Figure 6:
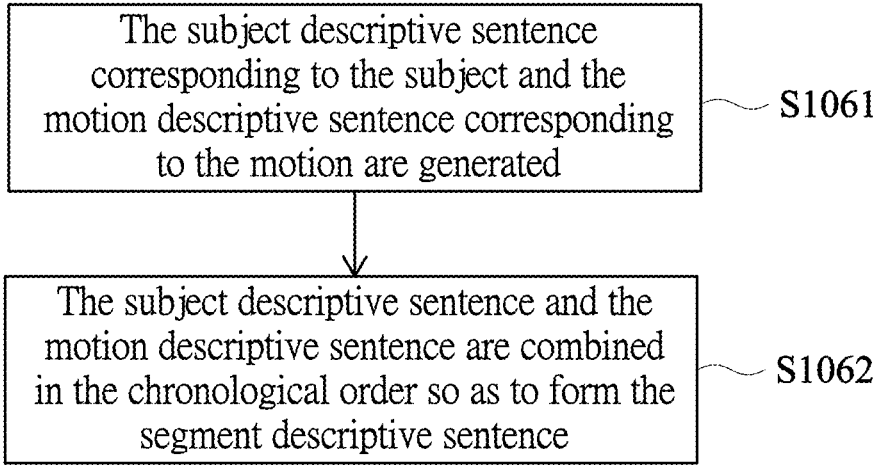
FIG. 6 is a flowchart illustrating the steps of the step S106 in the method of FIG. 2.
Figure 7A:
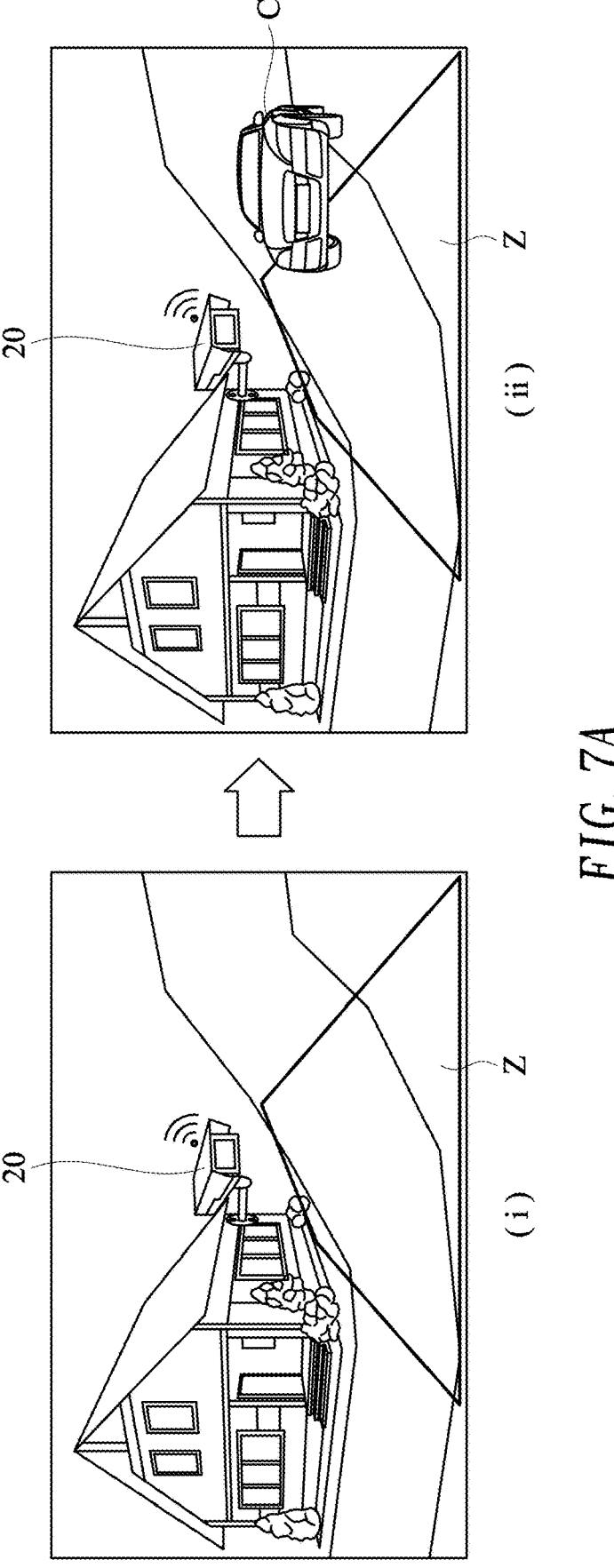
FIGS. 7A and 7B schematically illustrate the operations of the surveillance system with the function of automatically generating text summaries according to the embodiment of the present invention.
Figure 7B:
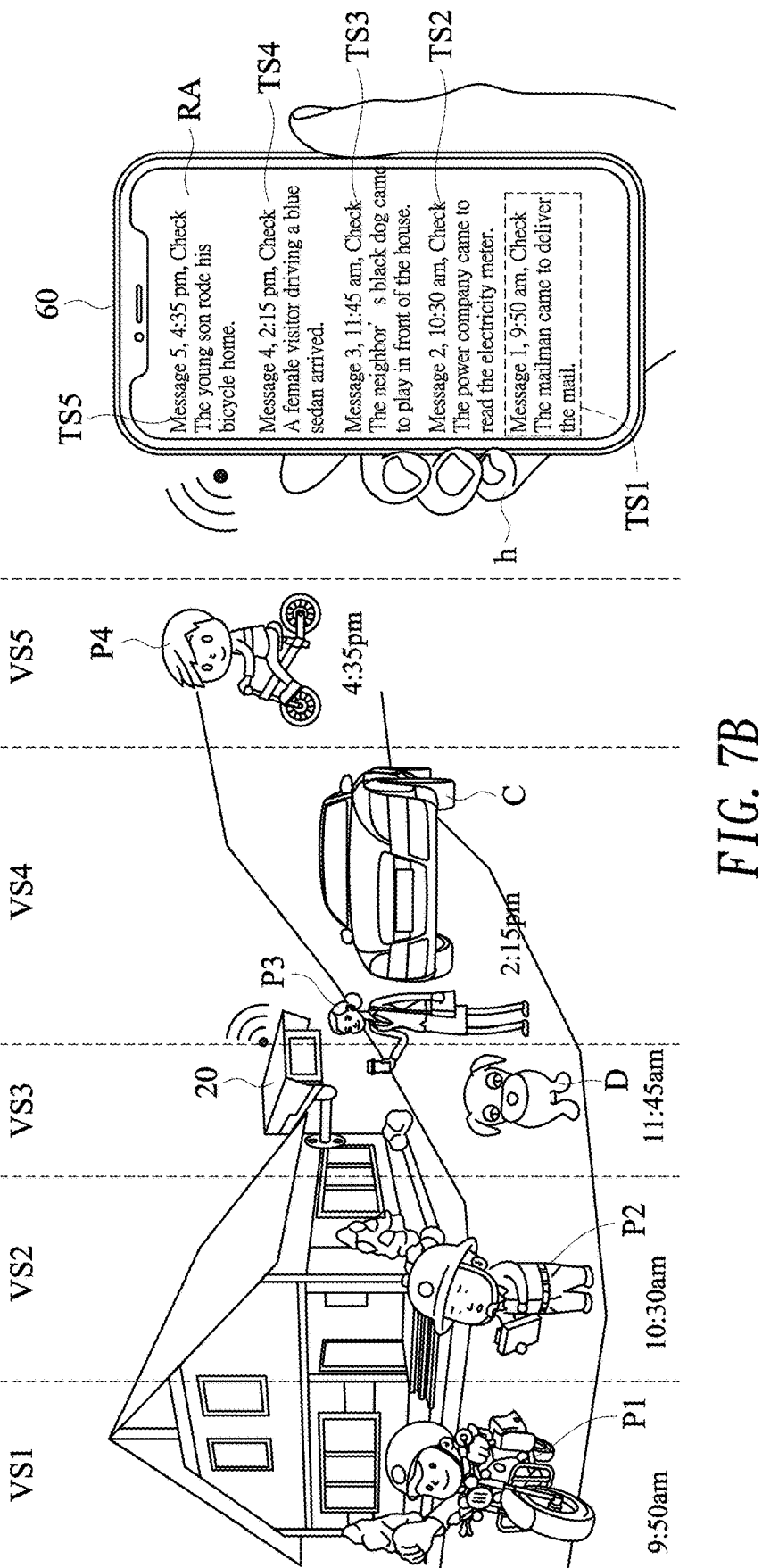

Please refer to FIGS. 2, 3, 4, 5, 6 and 7A. FIG. 2 is a flowchart illustrating an automatic text summary generation method through the captured images according to an embodiment of the present invention. FIG. 3 is a flowchart illustrating the steps of the step S100 in the method of FIG. 2. FIG. 4 is a flowchart illustrating the steps of the step S104 in the method of FIG. 2. FIG. 5 is a flowchart illustrating the steps of the step S105 in the method of FIG. 2. FIG. 6 is a flowchart illustrating the steps of the step S106 in the method of FIG. 2. FIGS. 7A and 7B schematically illustrate the operations of the surveillance system with the function of automatically generating text summaries according to the embodiment of the present invention.

Firstly, the range of a surveillance area Z and associated notification conditions are set (Step S100). In the step S100, the image capturing device 20 is placed in the environment under surveillance. For example, the image capturing device 20 is placed in the surroundings of the home environment or the product display area in a store. The user h can set the range of the surveillance area Z (i.e., the area shown in FIG. 7A(i)) for the image capturing device 20 and a notification condition through the input interface of the computing device 10 (e.g., a keyboard or a touch screen). In some possible implementation examples, the surveillance system 1 further includes specified notification conditions that are set for special situations (e.g., burglar intrusion, fire alarms, smoke alarms, falls of the elderly or children, or other possible anomaly situations). The specified notification conditions can be previously set by the surveillance system 1 or set by the user. When a specified notification condition is triggered, the surveillance system 1 will continuously perform the subsequent image processing and text generating steps. At the same time, the surveillance system 1 will automatically notify the police and fire departments, the medical units, the security companies or the user h of the surveillance system 1.

Please refer to FIG. 3. The step S100 includes steps of setting the range of the surveillance area Z (Step S1001), setting an object recognition feature in the notification condition (Step S1002) and setting an object motion recognition feature in the notification conditions (Step S1003). In the step S1002, the object recognition feature is used to determine whether any subject complying with the notification condition appears in the captured image. For example, the subjects related to the object recognition feature of vehicles include sedans, sport utility vehicles, station wagons, vans, coupes or convertibles. In the step S1003, the object motion recognition feature is used to determine whether any subject action complying with the notification conditions appears in the captured image. For example, the subject actions related to the object motion recognition feature include a vehicle entry action, a vehicle stopping action, a vehicle collision action, a vehicle overturning action, a vehicle speeding action, a reversing action, a vehicle door opening action or a vehicle door closing action.

In some possible implementation examples, the notification condition is triggered only when both the object recognition feature and the object motion recognition feature are met. In some other implementation examples, the notification condition is triggered when only the object recognition feature is met.

After the step S100, a step S101 is performed. In the step S101, the image capturing device 20 is driven to capture the image of the surveillance area Z. In an implementation example, the driven image capturing device 20 captures or records the image of the surveillance area Z all day. In another implementation example, the driven image capturing device 20 captures or records the image of the surveillance area Z during a preset time segment.

After the step S101, a step S102 is performed to judge whether the notification condition is triggered in response to the captured image. In the step S102, the computing device 10 reads and executes the intelligent application image recognition program 40, and the computing device 10 analyzes the image that is captured or recorded by the image capture device 20. According to the analysis result, the computing device 10 judges whether a subject and a subject action complying with the notification condition (e.g., having the object recognition feature and the object action recognition feature) appear in the captured image.

If the judging condition of the step S102 is not satisfied, the step S101 is repeatedly done. If the judging condition of the step S102 is satisfied, the image segment complying with the notification condition is extracted from the captured image (Step S103). In the step S103, the image segment complying with the notification condition (e.g., having the object recognition feature and the object action recognition feature) is extracted from the image of the surveillance area Z.

Then, the image segment is divided into a series of multiple image files (Step S104). In the step S104, the image files in the image segment are divided and extracted at a preset time interval.

Please refer to FIG. 4. The step S104 includes steps of dividing the image segment into multiple image files (Step S1041) and adding timestamps to the multiple image files respectively and sequentially (Step S1042). For example, the preset time interval is 5 seconds. Consequently, one image file is extracted from the image segment every 5 seconds in the step S1041, and timestamps such as 5S, 10S, 15S, 20S, etc., are sequentially added to the extracted image files in the step S1042. In subsequent processing steps, the sequence of the subjects and actions in the multiple image files can be determined according to the timestamps of the extracted image files. For example, the sequence may be: (1) the vehicle (subject) enters the yard and stops (action); (2) the vehicle's door opens (action); (3) the vehicle driver (subject) gets out of the vehicle (action).

Then, a subject and an action of the subject complying with the notification condition are extracted from each of the multiple image files (Step S105). In Step S105, the subjects and their actions from the series of image files are extracted according to the object recognition features and the object action recognition features in the notification conditions.

Please refer to FIG. 5. The step S105 includes steps of adding the timestamps to the multiple image files respectively and sequentially (Step S1051), extracting the subject complying with the object recognition feature according to the object recognition feature (Step S1052), and extracting the action complying with the object action recognition feature according to the object action recognition feature (Step S1053). The procedure of the step S1051 is identical to the procedure of the step S1042. If the step S1042 in the previous step S104 has not been executed, the procedure of adding timestamps can be carried out in the step S1051 of the step S105. Whereas, if the step S1042 in the previous step S104 has been executed, the step S1051 of the step S105 can be omitted.

Then, in the step S1052, the subject corresponding to the object recognition feature can be extracted. As shown in (ii) of FIG. 7A, when the vehicle C enters the surveillance area Z, the subject complying with the object recognition feature of the vehicle (i.e., the vehicle C) will be extracted. After the subject (vehicle C) is recognized, the action corresponding to the object action recognition feature of the vehicle (i.e., the action of driving into the surveillance area Z) will be extracted in the subsequent step S1053.

Then, a segment descriptive sentence corresponding to the subject and the action in each of the multiple image files is generated, and the segment descriptive sentence corresponding to the image segment is combined into a chain-type summary in a chronological order (Step S106). In Step S106, the segment descriptive sentences corresponding to the image segments from different time segments and complying with the identical or different notification conditions are combined in the chronological order, so that a chain-type summary corresponding to the multiple different time segments is formed.

Please refer to FIG. 6. The step S106 includes steps of generating the subject descriptive sentence corresponding to the subject and the motion descriptive sentence corresponding to the motion (Step S1061) and combining the subject descriptive sentence and the motion descriptive sentence in the chronological order so as to form the segment descriptive sentence (Step S1062). In the step S1061, the subject descriptive sentence corresponding to the subject (such as the vehicle C, for example "sedan") is generated, and the motion descriptive sentence corresponding to the action (such as the action of entering the surveillance zone Z, for example "enters the yard") is generated. In the step S1062, the subject descriptive sentence "sedan" and the motion descriptive sentence "enters the yard" are combined in the chronological order, and thus the segment descriptive sentence "sedan enters the yard" is formed. The scenario can be seen in FIG. 7A (ii).

After the step S106 is completed, the step S102 is performed again. Furthermore, a step S107 is performed simultaneously or subsequently. In the step S107, the chain-style summary is transmitted to the portable electronic device 60 of the user h. Consequently, through the portable electronic device 60, the user h can read the summary information that is generated by and transmitted from the computing device 10 or the cloud server 50.

Please refer to FIG. 7B. As shown in FIG. 7B, some image segments in the image that is captured by the image capturing device 20 and comply with the notification condition are extracted by the computing device 10 (as shown in FIG. 1A) or the cloud server 50 (as shown in FIG. 1B). For example, the image segment VS1 complying with the object recognition feature and the object action recognition feature of a mailman P1, the image segment VS2 complying with the object recognition feature and the object action recognition feature of a power company personnel P2, the image segment VS3 complying with the object recognition feature and the object action recognition feature of a dog D, the image segment VS4 complying with the object recognition feature and the object action recognition feature of a female visitor P3 and a vehicle C and the image segment VS5 complying with the object recognition feature and the object action recognition feature of a child P4 are extracted.

Then, the flowchart of FIG. 2 is used to process the image segments VS1, VS2, VS3, VS4 and VS5. Consequently, the segment descriptive sentences corresponding to the image segments VS1, VS2, VS3, VS4 and VS5 are generated. Furthermore, these segment descriptive sentences are combined to form a chain-type summary in a chronological order. Then, the chain-type summary is transmitted to the portable electronic device 60 of the user h.

In this embodiment, the chain-style summary RA displayed on the portable electronic device 60 contains a segment descriptive sentence TS1 (corresponding to the image segment VS1), a segment descriptive sentence TS2 (corresponding to the image segment VS2), a segment descriptive sentence TS3 (corresponding to the image segment VS3), a segment descriptive sentence TS4 (corresponding to the image segment VS4) and a segment descriptive sentence TS5 (corresponding to the image segment VS5). In this way, the user h can read the chain-style summary RA from the display interface of the portable electronic device 60 to quickly know and understand the status of the surveillance area Z.

Figure 8:
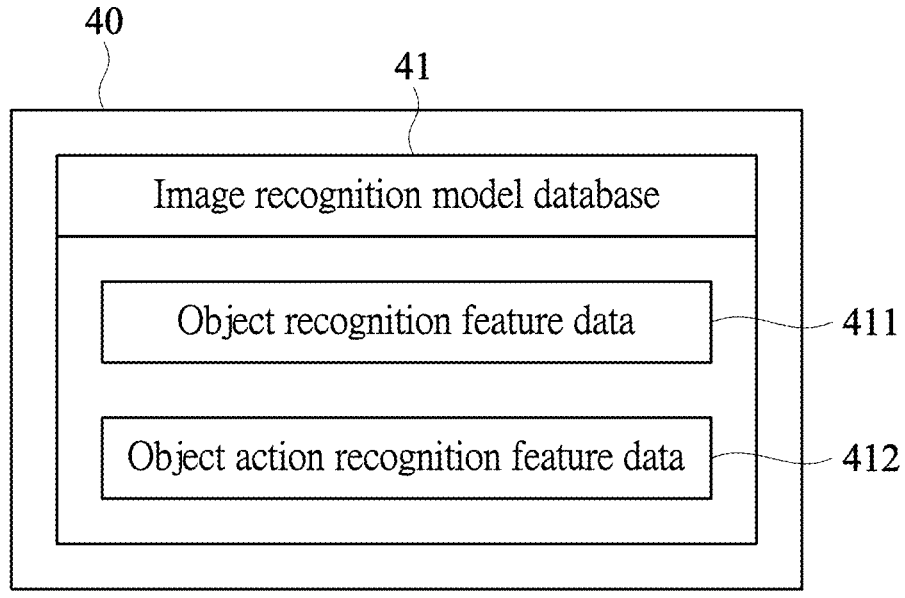
FIG. 8 is a system block diagram illustrating the architecture of an intelligent application image recognition program according to an embodiment of the present invention.

FIG. 8 is a system block diagram illustrating the architecture of an intelligent application image recognition program according to an embodiment of the present invention. The intelligent application image recognition program 40 is an intelligent application program structured by Generative AI (GenAI). As shown in FIG. 8, the intelligent application image recognition program 40 has an image recognition model database 41. In addition, the image recognition model database 41 contains a plurality of object recognition feature data 411 and a plurality of object action recognition feature data 412. Furthermore, the image recognition model database 41 can analyze the subjects in the image segments that do not fully comply with the object recognition features or the object action recognition features according to the input training data. For example, the image recognition model database 41 can analyze a vehicle model that does not comply with the preset object recognition features of vehicles, for example a military transport vehicle. In addition, the image of the military transport vehicle is used as the training data. According to this training data, the object recognition feature data and the object action recognition feature data corresponding to the military transport vehicle are added. Consequently, through the training and learning process, the new object recognition feature data 411 and the object action recognition feature data 412 will be added to the image recognition model database 41.

From the above descriptions, the present invention provides a surveillance system with the function of automatically generating text summaries. When compared with the conventional technologies, the technologies of the present invention are more advantageous. When a specified notification condition is triggered, the image segment complying with the notification conditions is extracted from the captured image, and the segment descriptive sentence and the chain-type summary corresponding to the image segment are generated. The user can obtain the chain-type summary through the portable electronic device. Consequently, the user can quickly understand the status of the surveillance area according to the chain-type summary without the need to spend a large amount of time and effort to watch surveillance images.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A surveillance system with a function of automatically generating text summaries, the surveillance system comprising:

a portable electronic device;

an image capturing device capturing an image of a surveillance area;

a computing device storing an intelligent application image recognition program, wherein when the intelligent application image recognition program in the computing device is read and executed, an automatic text summary generation method is performed, wherein the automatic text summary generation method comprises steps of:

(a) setting a range of the surveillance area and a notification condition;

(b) driving the image capturing device to capture the image of the surveillance area;

(c) judging whether the notification condition is triggered in response to the captured image;

(d) if an image segment in the captured image complies with the notification condition, extracting the image segment from the captured image;

(e) divided the image segment into a series of multiple image files;

(f) extracting a subject and an action of the subject complying with the notification condition from each of the multiple image files; and (g) generating a segment descriptive sentence corresponding to the subject and the action in each of the multiple image files, and combining the segment descriptive sentence corresponding to the image segment into a chain-type summary in a chronological order; and a signal transmission device in communication with each of the portable electronic device, the image capturing device and the computing device, wherein the chain-type summary is transmitted from the computing device to the portable electronic device through the signal transmission device via the communication.

2. The surveillance system according to claim 1, wherein in the step (a), the notification condition contains at least one object recognition feature and at least one object motion recognition feature.

3. The surveillance system according to claim 2, wherein the step (f) performed by the computing device comprises steps of:

(f1) extracting the subject complying with the at least one object recognition feature according to the at least one object recognition feature; and (f2) extracting the action complying with the at least one object action recognition feature according to the at least one object action recognition feature.

4. The surveillance system according to claim 3, wherein the step (f) performed by the computing device further comprises a step of adding timestamps to the multiple image files respectively and sequentially.

5. The surveillance system according to claim 3, wherein the step (g) performed by the computing device comprises steps of:

(g1) generating a subject descriptive sentence corresponding to the subject and a motion descriptive sentence corresponding to the motion; and (g2) combining the subject descriptive sentence and the motion descriptive sentence in the chronological order so as to form the segment descriptive sentence.

6. The surveillance system according to claim 1, wherein the step (e) performed by the computing device comprises steps of:

(e1) dividing the image segment into the multiple image files; and (e2) adding timestamps to the multiple image files respectively and sequentially.

7. The surveillance system according to claim 1, wherein the computing device is a home computer or a cloud server.

8. The surveillance system according to claim 1, wherein the intelligent application image recognition program has an image recognition model database, and the image recognition model database contains a plurality of object recognition feature data and a plurality of object action recognition feature data, wherein the plurality of object recognition feature data and the plurality of object action recognition feature data are added to the image recognition model database according to input training data from the image segment.

9. An automatic text summary generation method for analyzing an image that is captured in a surveillance area by an image capturing device, the automatic text summary generation method comprising steps of:

(a) setting a range of the surveillance area and a notification condition;

(b) driving the image capturing device to capture the image of the surveillance area;

(c) judging whether the notification condition is triggered in response to the captured image;

(d) if an image segment in the captured image complies with the notification condition, extracting the image segment from the captured image;

(e) divided the image segment into a series of multiple image files;

(f) extracting a subject and an action of the subject complying with the notification condition from each of the multiple image files; and (g) generating a segment descriptive sentence corresponding to the subject and the action in each of the multiple image files, and combining the segment descriptive sentence corresponding to the image segment into a chain-type summary in a chronological order; and (h) transmitting the chain-type summary to a portable electronic device.

10. The automatic text summary generation method according to claim 9, wherein in the step (a), the notification condition contains at least one object recognition feature and at least one object motion recognition feature.

11. The automatic text summary generation method according to claim 10, wherein the step (f) comprises steps of:

(f1) extracting the subject complying with the at least one object recognition feature according to the at least one object recognition feature; and (f2) extracting the action complying with the at least one object action recognition feature according to the at least one object action recognition feature.

12. The automatic text summary generation method according to claim 11, wherein the step (f) further comprises a step of adding timestamps to the multiple image files respectively and sequentially.

13. The automatic text summary generation method according to claim 11, wherein the step (g) comprises steps of:

(g1) generating a subject descriptive sentence corresponding to the subject and a motion descriptive sentence corresponding to the motion; and (g2) combining the subject descriptive sentence and the motion descriptive sentence in the chronological order so as to form the segment descriptive sentence.

14. The automatic text summary generation method according to claim 9, wherein the step (e) comprises steps of:

(e1) dividing the image segment into the multiple image files; and (e2) adding timestamps to the multiple image files respectively and sequentially.

* * * * *